Sept. 3, 1968                L. A. PORTNOFF                3,399,906

OCCUPANT-PROPELLED SKATE BOARD VEHICLE

Filed Feb. 4, 1966

INVENTOR.
LAWRENCE A. PORTNOFF
BY *Sidney B. Ring*
ATTORNEY

3,399,906
OCCUPANT-PROPELLED SKATE BOARD VEHICLE
Lawrence A. Portnoff, St. Louis, Mo. (% Sidney B. Ring, P.O. Box 6825, Brentwood, Mo. 63144)
Filed Feb. 4, 1966, Ser. No. 525,077
1 Claim. (Cl. 280—221)

ABSTRACT OF THE DISCLOSURE

A skate board play vehicle capable of foot propulsion by occupant without pushing against the ground, said skate board including a platform having wheels activated by a toothed arm-gear assembly means for substantially immediate translation of motion to said wheels, said assembly means including an arcuately shaped toothed arm and gear in a ratchet relationship with the toothed arm being longitudinally disposed with respect to the gear, and means for substantially immediately moving said toothed arm, said means including a spring loaded pedal with the spring connected at one end to the pedal, said toothed arm being movable for engagement with the upper portion of the gear.

---

In general, this invention relates to a play vehicle.

This invention relates to a play vehicle, for example of the platform type, such as of the skate board or scooter type, and other types, which are capable of propulsion by a mechanical assembly contained therein. More particularly this invention relates to said vehicle which is activated by the occupant thereof such as by his foot.

Still more particularly, this invention relates to said vehicle containing a foot activated mechanical assembly of a toothed arm-gear assembly type for propelling said vehicle, particularly where the toothed arm and gear have a ratchet relationship.

Heretofore, when vehicles such as skate boards, scooters and the like have been employed, the rider propels the vehicle by means of keeping one foot on the vehicle and employing the other to push against the ground. Heretofore, no one has devised a mechanical assembly whereby propulsion could be effected on a non-hilly area while maintaining both feet on the vehicle.

I have now devised a play vehicle, for example of the platform type such as of the skate board or scooter type, and other types, which is capable of propulsion without pushing against the ground by employing a mechanical assembly which can be activated by the rider while maintaining both feet on the vehicle. Stated another way, the vehicle can be foot activated without pushing against the ground.

The invention will become apparent from the following illustrative description and accompanying drawings in which.

Figure 1:
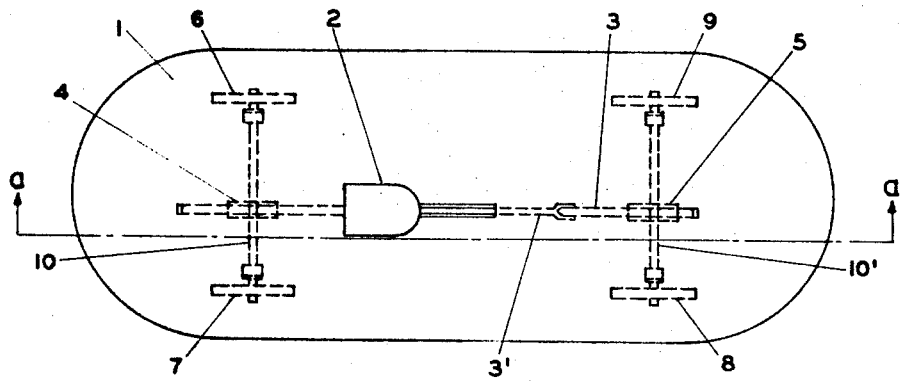
FIGURE 1 is a plan view of a skate board embodying the present invention looking down from above, in which the under section of the skate board is presented in dotted lines.

In FIG. 1, the numeral 1 is the surface of the skate board, 2 is a pedal which activates the toothed arm 3 by means of activating arm 3'. The teeth of said arm contact gears 4 and 5 in a ratchet relationship which translates motion to wheels 6, 7, 8 and 9 on the positive stroke. After the positive stroke is completed, any suitable means, such as a spring, returns the pedal and the toothed arm to its original position. In returning to its original position the gears because of their ratchet relationship with the toothed arm are out of forward contact with axles 10 and 10', so that no motion is translated to the wheels. Means for engaging or disengaging the gear are of a ratchet type. By repeated positive strokes, and lack of activating contact with the gear on the return stroke, forward motion is imparted to the skate board so that a speed build up is achieved. Other means of disengaging the toothed arm on the return stroke can also be employed, such as for example, by a device which lifts the toothed arm out of contact with the gear on the return stroke.

Figure 2:
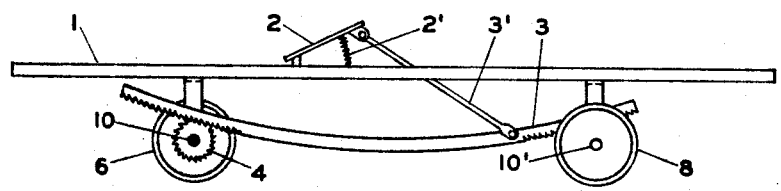
FIG. 2 is a partial vertical section along line a—a of FIG. 1.

In FIG. 2, 1 is the skate board, 2 is the pedal which activates the toothed arm 3 through activating arm 3'. 2' is a spring which returns the pedal to its starting position. The toothed arm contacts gears 4 and 5 (not shown behind wheel 8) in a ratchet relationship which translates forward motion to the wheels through the axles 10 and 10'.

Figure 3:
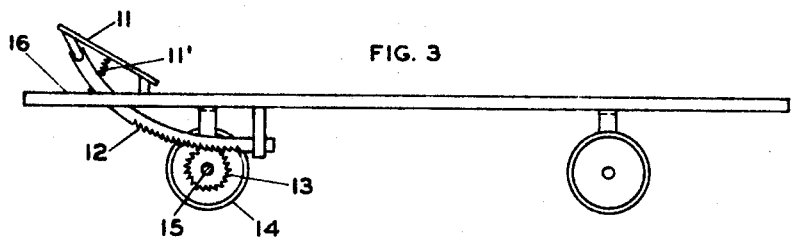
FIG. 3, is a partial section which illustrates another embodiment of the skate board.
Figure 4:
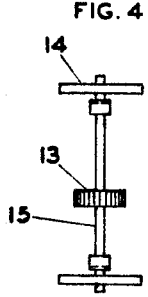
FIG. 4 is a plan view of the gear-axle-wheel assembly in which 13 is a gear, 14 is a wheel and 15 an axle.

In FIG. 3, the pedal activates the toothed arm 12 over the gear 13 translating motion to wheel 14 through axle 15 thus propelling the skate board 16. 11' is a spring which returns the pedal to its starting position. Additional springs positioned where desired may also be employed. As in FIGURES 1 and 2 the positive stroke propels whereas the return stroke does not engage the axle since the gear disengages in relation to forward motion of the axle upon the return stroke due to the ratchet relationship of toothed arm and gear.

The toothed arm and the pedal returns to the original position by any suitable means such as a spring device.

In the preferred embodiment, a toothed arm is employed to activate a gear assembly in ratchet relationship to the toothed arm which in turn activates the wheels. One or more gears of various types may be employed. Thus, for example, one may employ spur gears, bevel gears, worm gearing, spiral gears, helical gears, chain gears, etc. One may also employ a series of gears so as to magnify mechanical effort therefor by modifying the gear ratios.

Whatever assembly is employed, by repeated action of the positive stroke, and neutral action on the return stroke, the occupant is able to accelerate the vehicle and to maintain the desired speed. A ratchet relationship is employed to engage the gear on the positive stroke and release the gear on the return stroke. The toothed arm may be returned to the original position by one or more devices such as a spring or a plurality of springs. The number of wheels on the vehicle may vary as desired and may have 3, 4, 5, 6, 7, 8, etc. wheels.

Other suitable mechanical assemblies can be employed. The invention is not limited to the exemplary construction herein shown and described but may be made in various ways, within the scope of the appended claim. For example, the toothed arm-gear assembly is in certain instances used in other than toy vehicles of the platform type.

Having thus described my invention what I claim as new and desire to obtain by Letters Patent is:

1. A skate board including a platform having wheels activated by a toothed arm-gear assembly means for substantially immediate translation of motion to said wheels, said toothed arm-gear assembly means including a toothed arm and a gear, said toothed arm and said gear being in a ratchet relationship, said toothed arm being longitudinally disposed with respect to said gear, said toothed arm being arcuately shaped, and means for substantially immediately moving said toothed arm, said means including a spring loaded pedal wherein said spring is connected at one end to said pedal, said toothed arm being movable for engagement with the upper portion of said gear.

References Cited

UNITED STATES PATENTS

| | | | | |
|---|---|---|---|---|
| 1,315,878 | 9/1919 | Stocks | | 280—254 |
| 1,437,314 | 11/1922 | Jorgensen | | 280—11.11 |
| 3,288,251 | 11/1966 | Sakwa | | 280—87.04 |

FOREIGN PATENTS 412,799  2/1946  Italy.

KENNETH H. BETTS, *Primary Examiner.*